United States Patent
Hou et al.

(10) Patent No.: US 9,967,099 B2
(45) Date of Patent: May 8, 2018

(54) METHOD AND APPARATUS FOR PROVIDING INFORMATION

(71) Applicant: Xiaomi Inc., Beijing (CN)

(72) Inventors: Enxing Hou, Beijing (CN); Deguo Meng, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 172 days.

(21) Appl. No.: 14/992,529

(22) Filed: Jan. 11, 2016

(65) Prior Publication Data

US 2016/0315773 A1   Oct. 27, 2016

(30) Foreign Application Priority Data

Apr. 27, 2015   (CN) .......................... 2015 1 0204795

(51) Int. Cl.

| | |
|---|---|
| *H04L 29/06* | (2006.01) |
| *H04L 9/32* | (2006.01) |
| *H04W 12/06* | (2009.01) |
| *H04W 12/08* | (2009.01) |
| *H04L 9/30* | (2006.01) |
| *H04W 84/12* | (2009.01) |
| *H04W 92/02* | (2009.01) |

(52) U.S. Cl.
CPC .............. *H04L 9/3226* (2013.01); *H04L 9/30* (2013.01); *H04W 12/06* (2013.01); *H04W 12/08* (2013.01); *H04W 84/12* (2013.01); *H04W 92/02* (2013.01)

(58) Field of Classification Search
CPC ................................................. H04L 63/3226

USPC ......................................................... 713/155
See application file for complete search history.

(56) References Cited

U.S. PATENT DOCUMENTS

| | | | |
|---|---|---|---|
| 7,420,940 | B2 | 9/2008 | Fukui |
| 8,290,163 | B2 | 10/2012 | Chang et al. |
| 9,306,810 | B2 * | 4/2016 | Oslund .................. H04L 41/22 |
| 2005/0107089 | A1 | 5/2005 | Fukui |
| 2007/0174901 | A1 | 7/2007 | Chang et al. |
| 2008/0159536 | A1 | 7/2008 | Chang et al. |
| 2009/0235345 | A1 | 9/2009 | Oikawa et al. |
| 2011/0072101 | A1 | 3/2011 | Forssell et al. |

(Continued)

FOREIGN PATENT DOCUMENTS

| | | |
|---|---|---|
| CN | 101005351 A | 7/2007 |
| CN | 100571127 C | 12/2009 |
| CN | 102711110 A | 10/2012 |

(Continued)

OTHER PUBLICATIONS

Extended European Search Report from European Patent Office for European Application No. 15201153.2, dated Sep. 15, 2016 (6 pages).

(Continued)

*Primary Examiner* — Longbit Chai
(74) *Attorney, Agent, or Firm* — Finnegan, Henderson, Farabow, Garrett & Dunner LLP

(57) ABSTRACT

A method for providing information includes acquiring modified access authentication information after detecting that access authentication information for accessing a gateway device is modified, determining a device to be notified corresponding to the modified access authentication information, and providing the modified access authentication information to the device to be notified.

15 Claims, 6 Drawing Sheets

(56) References Cited

U.S. PATENT DOCUMENTS

2011/0252237 A1* 10/2011 PalChaudhuri ....... H04L 9/3226
                                                                  713/168

FOREIGN PATENT DOCUMENTS

| | | |
|---|---|---|
| CN | 103795638 A | 5/2014 |
| CN | 104869609 A | 8/2015 |
| EP | 2615776 A1 | 7/2013 |
| JP | 2005039632 A | 2/2005 |
| JP | 2005-117488 A | 4/2005 |
| JP | 2007213570 A | 8/2007 |
| JP | 2009223452 A | 10/2009 |
| KR | 100737526 B1 | 7/2007 |
| KR | 20100092870 A | 8/2010 |
| KR | 101192442 | 10/2012 |
| KR | 20120137239 A | 12/2012 |
| RU | 2436246 C2 | 12/2011 |
| WO | WO 2009-146741 * | 12/2009 |
| WO | WO 2009/146741 A1 | 12/2009 |

OTHER PUBLICATIONS

English version of International Search Report of PCT Application No. PCT/CN2015/090312, dated Jan. 13, 2016, issued by the State Intellectual Property Office of P.R. China as ISA.
International Search Report of PCT Application No. PCT/CN2015/090312, dated Jan. 13, 2016, issued by the State Intellectual Property Office of P.R. China as ISA (4 pages).

* cited by examiner

METHOD AND APPARATUS FOR PROVIDING INFORMATION

CROSS-REFERENCE TO RELATED APPLICATIONS

This application is based upon and claims priority to Chinese Patent Application No. 201510204795.2, filed Apr. 27, 2015, the entire contents of which are incorporated herein by reference.

TECHNICAL FIELD

The present disclosure relates to wireless network technology and, more particularly, to a method and apparatus for providing information.

BACKGROUND

A router is a gateway device that provides a wireless network access service for an access device, such as a mobile phone, a tablet, or a smart household device. The access device can acquire access authentication information from the router and establish a wireless network connection with the router by using the access authentication information as a certificate. The access authentication information includes a Service Set Identifier (SSID) and a password of the router.

SUMMARY

In accordance with the present disclosure, there is provided a method for providing information. The method includes acquiring modified access authentication information after detecting that access authentication information for accessing a gateway device is modified, determining a device to be notified corresponding to the modified access authentication information, and providing the modified access authentication information to the device to be notified.

Also in accordance with the present disclosure, there is provided a gateway device including a processor and a memory storing instructions. The instructions, when executed by the processor, cause the processor to acquire modified access authentication information after detecting that access authentication information for accessing the gateway device is modified, determine a device to be notified corresponding to the modified access authentication information, and provide the modified access authentication information to the device to be notified.

Also in accordance with the present disclosure, there is provided a non-transitory computer-readable storage medium storing instructions that, when executed by a processor of a gateway device, cause the gateway device to acquire modified access authentication information after detecting that access authentication information for accessing the gateway device is modified, determine a device to be notified corresponding to the modified access authentication information, and provide the modified access authentication information to the device to be notified.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
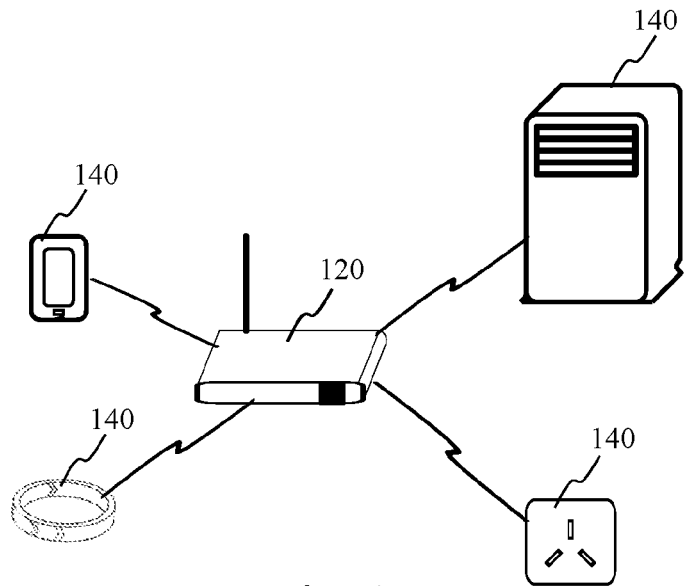
FIG. 1 is a view of an implementation environment in which embodiments in the present disclosure may be practiced.

FIG. 1 is a view of an implementation environment in which embodiments in the present disclosure may be practiced. The implementation environment includes a gateway device 120 and at least one access device 140.

The gateway device 120 includes a computer system or device used to provide data transformation services among multiple networks. The gateway device 120 may be a router, a switch, a firewall, or a host with a routing function. In embodiments of the present disclosure, the gateway device 120 is illustrated as a router.

The access device 140 and the gateway device 120 are in the same local area network. The access device 140 may establish a wireless network connection with the gateway device 120 based on access authentication information of the gateway device 120, i.e., information for authenticating access to the gateway device 120. The wireless network connection is a Wireless Fidelity (Wi-Fi) network connection. The access authentication information typically includes an SSID and a corresponding password.

The access device 140 may be any electronic device having a wireless network access function. For example, the access device 140 may be a mobile terminal device (such as a mobile phone, a tablet, an e-book reader, or a personal digital assistant), a smart household device (such as a smart plug, a smart camera, a smart TV, or a smart air conditioner), or a wearable device (such as a smart wristband, a smart watch, smart glasses, or a smart helmet).

Figure 2:
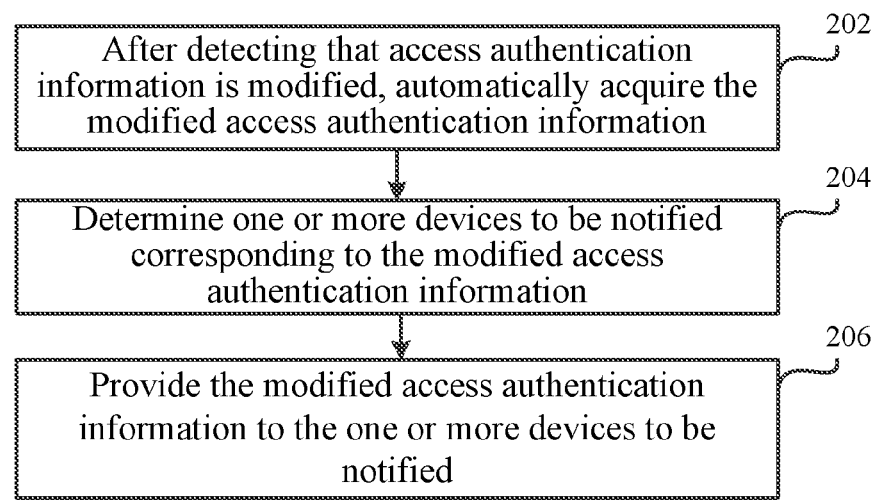
FIG. 2 illustrates a flow chart of a method for providing information, according to an exemplary embodiment.

FIG. 2 illustrates a flow chart of a method 200 for providing information, according to an exemplary embodiment. The method 200 can be implemented, for example, in the gateway device 120 in the implementation environment shown in FIG. 1. As shown in FIG. 2, at 202, a modification to access authentication information is detected, and the modified access authentication information is automatically acquired. At 204, one or more devices corresponding to the modified access authentication information are determined. Such a device is also referred to as a device to be notified. At 206, the modified access authentication information is provided to the one or more devices to be notified.

In some embodiments, to determine the one or more devices to be notified, a first device list is provided to a user terminal connected with the gateway device 120. The first device list includes device identifications of the access devices 140 currently connected to the gateway device 120. After a target device identification sent by the user terminal is received, an access device 140 corresponding to the target device identification is determined as the device to be notified. The target device identification is selected by the user terminal from the first device list.

In some embodiments, the modified access authentication information is sent to the one or more devices to be notified via a wireless network connection, which is established between the gateway device 120 and the one or more devices to be notified based on access authentication information before being modified, also referred to as "unmodified access authentication information."

In some embodiments, an access device 140 that receives the modified access authentication information may return an acknowledging response to the gateway device 120 to acknowledge successful receipt of the modified access authentication information.

In some embodiments, at least two access devices 140 need to be notified of the modified access authentication information, but the gateway device 120 may have not received the acknowledging response from every device to be notified. In this scenario, acknowledging responses received by the gateway device 120 can be used to determine access devices 140 that are yet to be notified. Such an access device 140 is also referred to as a remaining device to be notified.

In some embodiments, to determine the remaining devices to be notified, device identifications of the access devices 140 sending the acknowledging responses are compared with device identifications of the devices to be notified, and the remaining devices to be notified are determined according to the comparison results. This can be done in the gateway device 120. Alternatively, the comparison can be done by a server. That is, a second device list containing the device identifications of those devices to be notified that have sent the acknowledging responses and a third device list containing the device identifications of all of the devices to be notified can be sent to the server. The server compares the second device list with the third device list, and determines the remaining devices to be notified. The server returns a fourth device list, which contains the device identifications of the remaining devices to be notified.

In some embodiments, a target access device 140 can broadcast an access request, which is acquired by the gateway device 120. The access request carries a device identification of the target access device 140. Upon receiving the access request, the gateway device 120 determines whether the target access device 140 is a remaining device to be notified according to the device identification of the target access device 140. If the target access device 140 is a remaining device to be notified, the modified access authentication information is sent to the target access device 140.

In some embodiments, after it is determined that the modified access authentication information has been successfully received by all the devices to be notified, the modified access authentication information is enabled. Alternatively, the modified access authentication information can be enabled at a predetermined time after the modified access authentication information is sent.

Figure 3:
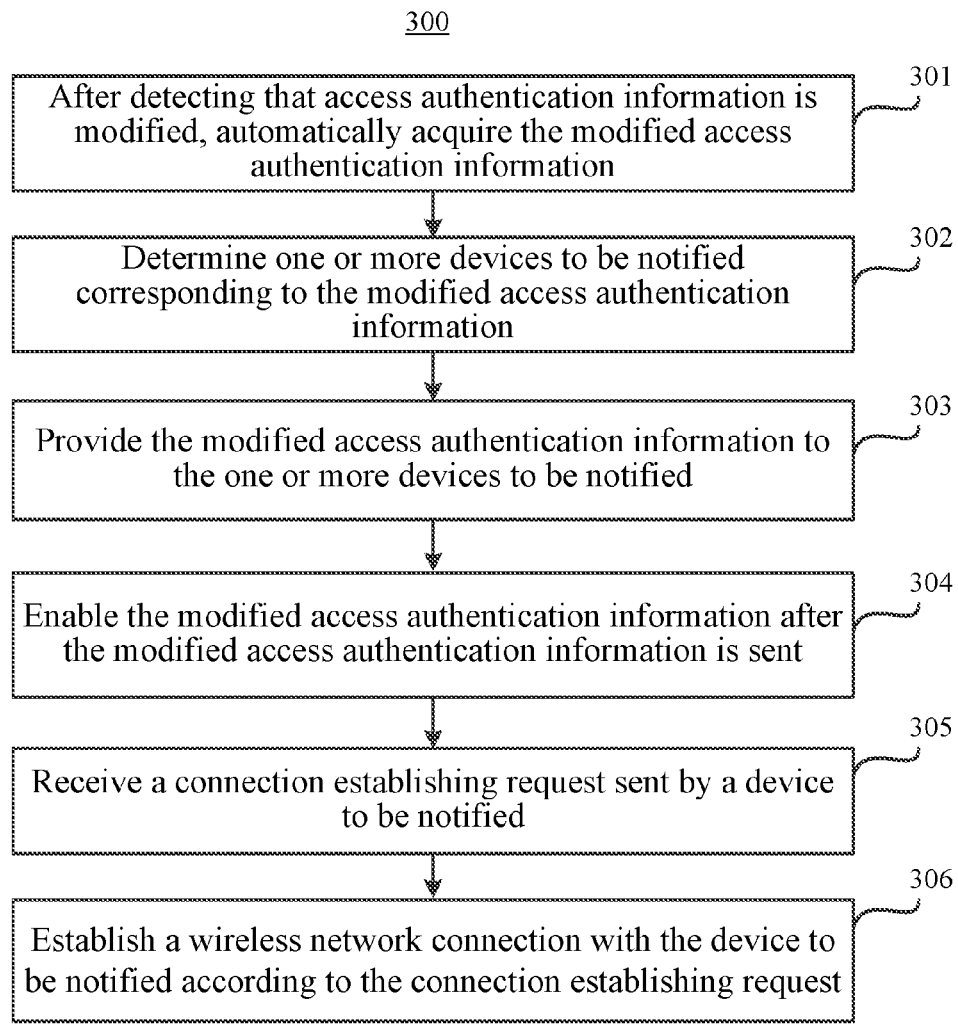
FIG. 3 illustrates a flow chart of a method for providing information, according to another exemplary embodiment.

FIG. 3 illustrates a flow chart of a method 300 for providing information, according to another exemplary embodiment. The method 300 can be implemented, for example, in the gateway device 120 in the implementation environment shown in FIG. 1. As shown in FIG. 3, at 301, after detecting that access authentication information is modified, the gateway device 120 automatically acquires the modified access authentication information. The modified access authentication information includes at least one of a modified SSID and a modified password.

For example, the gateway device 120 may be a router. A user may login to the router through a browser or a client terminal according to a login address of the router, and then modify an SSID and/or a password of the router in the corresponding setting options. Correspondingly, the router automatically acquires the modified access authentication information after detecting that the access authentication information of the router is modified.

At 302, the gateway device 120 determines one or more devices to be notified corresponding to the modified access authentication information. The one or more devices to be notified may be determined according to various approaches. For example, the one or more devices to be notified may be automatically selected by the gateway device 120 according to a pre-configuration. For example, the one or more devices to be notified may be all or some of the access devices 140 that are currently connected to the gateway device 120. Alternatively, the one or more devices to be notified may be selected by the user.

In some embodiments, in order for the user to select the one or more devices to be notified, the gateway device 120 provides a first device list to a user terminal connected with the gateway device 120. The first device list includes device identifications of access devices 140 currently connected to the gateway device. For example, the gateway device 120 stores the device identifications of the access devices 140 currently connected with the gateway device 120, and provides the first device list that includes the device identifications of all of the above-mentioned access devices 140 to the user terminal connected with the gateway device 120. The user terminal can be used to manage the access devices 140 connected with the gateway device 120. The device identifications are used to distinguish different access devices 140. In some embodiments, the device identification of an access device 140 can be a Media Access Control (MAC) address of the access device 140.

In some embodiments, the gateway device 120 may send the first device list to the user terminal via a Wi-Fi network connection established with the user terminal. The Wi-Fi network connection is established between the gateway device 120 and the user terminal based on the unmodified access authentication information. Since the modified access authentication information has not been put into service by the gateway device 120 at the time the first device list is sent, the Wi-Fi network connection established based on the unmodified access authentication information is not interrupted, and the gateway device 120 can still communicate with the user terminal via the Wi-Fi network connection, and send the first device list to the user terminal.

Alternatively, the gateway device 120 may send the first device list to the user terminal via an extended connection channel. The extended connection channel may be a wireless connection channel or a wired connection channel. The wireless connection channel includes, but is not limited to, a wireless connection established based on any one of the following technologies: Bluetooth technology, ZigBee technology, Ultra Wide Band (UWB) technology, and Radio Frequency Identification (RFID) technology. The wired connection channel includes, but is not limited to, a wired connection established based on any one of the following technologies: Universal Serial Bus (USB) technology, serial port technology, and pin direct-connect technology.

After sending the first device list, the gateway device 120 receives one or more target device identifications sent by the user terminal, and determines one or more access devices corresponding to the one or more target device identifications as the one or more devices to be notified. The one or more target device identifications are selected by the user terminal from the first device list.

For example, after receiving the first device list sent by the gateway device 120, the user terminal displays the first device list. When the user determines that the modified access authentication information needs to be provided to one or more access devices, the user selects one or more device identifications corresponding to the one or more access devices from the first device list as one or more target device identifications. After that, the user terminal sends the one or more target device identifications selected by the user to the gateway device 120. Correspondingly, the gateway device 120 receives the one or more target device identifications sent by the user terminal, and determines one or more access devices corresponding to the one or more target device identifications as the one or more devices to be notified.

At 303, the gateway device 120 provides the modified access authentication information to the one or more devices to be notified. Thus, since the gateway device 120 actively provides the modified access authentication information to the one or more devices to be notified, the one or more devices to be notified can acquire the modified access authentication information in a simpler and more efficient manner. In addition, the user does not need to manually provide the modified access authentication information to respective access devices 140. As such, the user experience is improved.

In some embodiments, the gateway device 120 sends the modified access authentication information to the one or more devices to be notified via a wireless network connection. The wireless network connection is established between the gateway device 120 and the one or more devices to be notified based on the unmodified access authentication information, and the wireless network connection can be a Wi-Fi network connection. Since at this stage the modified access authentication information has not been enabled in the gateway device 120 yet, the wireless network connection established between the gateway device 120 and the one or more devices to be notified is not interrupted, and the gateway device 120 may still communicate with the one or more devices to be notified via the wireless network connection. In some embodiments, the gateway device 120 sends the modified access authentication information to respective devices to be notified respectively in the form of point-to-point transmission.

In some embodiments, in order to improve the security of the access authentication information, the gateway device 120 may also encrypt the modified access authentication information before sending the modified access authentication information to the one or more devices to be notified.

In some embodiments, the gateway device 120 and all the access devices 140 in the local area network appoint a same public key in advance. For example, after a wireless network connection is successfully established between respective access devices 140 and the gateway device 120, the gateway device 120 sends the public key to the access devices 140 via the wireless network connection. The gateway device 120 uses the public key to encrypt the modified access authentication information. After that, the gateway device 120 sends the encrypted access authentication information to the one or more devices to be notified.

In some embodiments, the gateway device 120 and different access devices 140 in the local area network appoint different private keys in advance. For example, after a wireless network connection is successfully established between one of the access devices 140 and the gateway device 120, the gateway device 120 assigns a private key to that access device 140, and sends the private key to the access device 140 via the wireless network connection. Alternatively, after the wireless network connection is successfully established between one of the access devices 140 and the gateway device 120, that access device 140 sends a private key to the gateway device 120 via the wireless network connection. In addition, the gateway device 120 stores a corresponding relationship between the device identifications of different access devices and different private keys. After that, for each device to be notified, before sending the modified access authentication information to the device to be notified, the gateway device 120 encrypts the modified access authentication information by using the private key corresponding to the device to be notified according to the above corresponding relationship, and then sends the encrypted access authentication information to the device to be notified.

Correspondingly, the device to be notified receives the modified access authentication information sent by the gateway device.

In addition, when the modified access authentication information is the access authentication information encrypted by using the public key, the device to be notified uses the public key to decrypt the modified access authentication information, and reads the modified access authentication information. When the modified access authentication information is the access authentication information encrypted by using the private key, the device to be notified uses the private key to decrypt the modified access authentication information, and reads the modified access authentication information.

In some embodiments, as shown in FIG. 3, at 304, the gateway device 120 enables the modified access authentication information after the modified access authentication information is sent. For example, the gateway device 120 enables the modified access authentication information at a certain time, such as 10 seconds, after the modified access authentication information is sent. Since the access authentication information of the gateway device is modified, in order to avoid configuration errors, in some embodiments, the gateway device 120 may restart, and enable the modified access authentication information after restart.

In some embodiments, as shown in FIG. 3, at 305, the gateway device 120 receives a connection establishing request sent by a device to be notified. At 306, the gateway device 120 establishes a wireless network connection with the device to be notified according to the connection establishing request.

That is, after receiving the modified access authentication information, a device to be notified may re-establish a wireless network connection with the gateway device 120 by using the modified access authentication information via, for example, a process known to a person skilled in the art.

Figure 4:
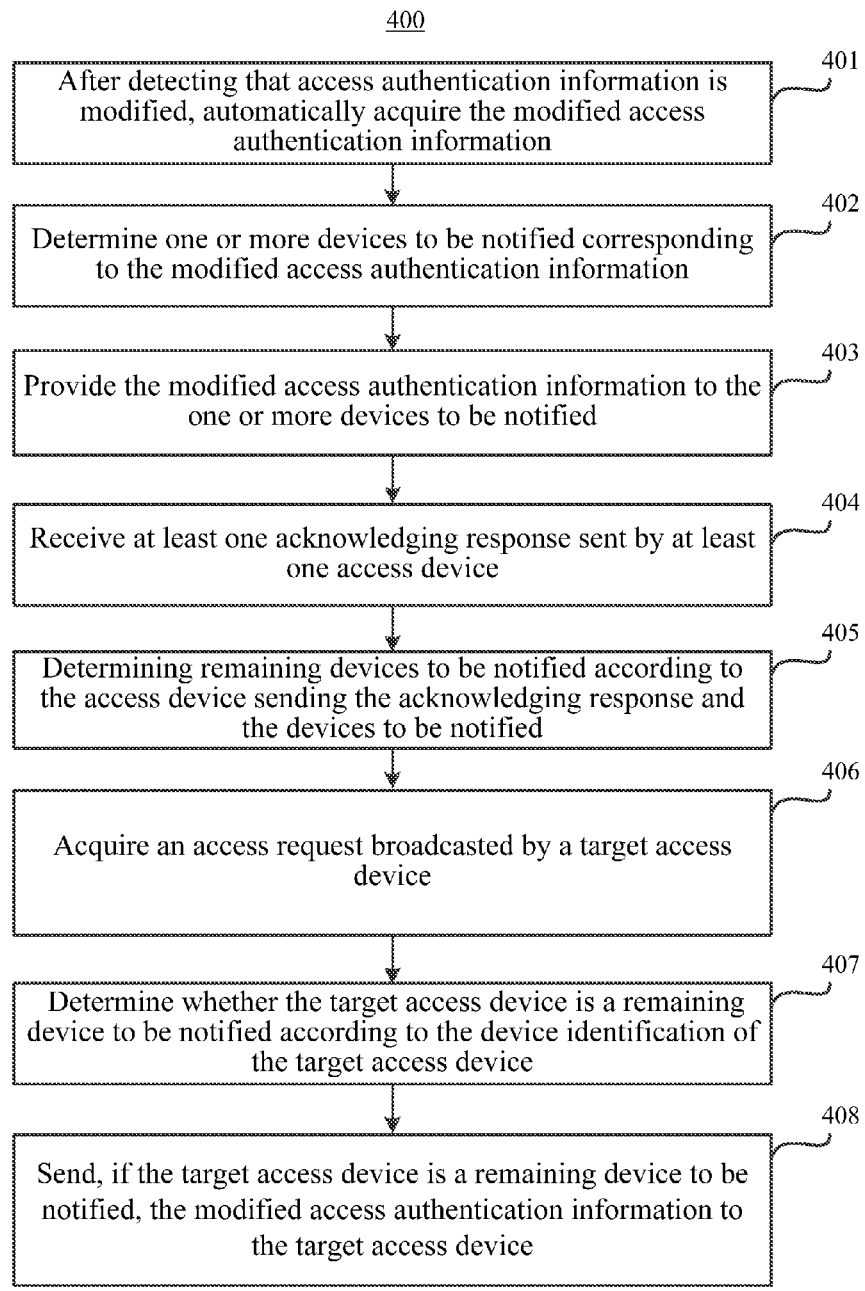
FIG. 4 illustrates a flow chart of a method for providing information, according to another exemplary embodiment.

FIG. 4 illustrates a flow chart of a method 400 for providing information, according to another exemplary embodiment. The method 400 can be implemented, for example, in the gateway device 120 in the implementation environment shown in FIG. 1. As shown in FIG. 4, at 401, after detecting that access authentication information is modified, the gateway device 120 automatically acquires the modified access authentication information. At 402, the gateway device 120 determines one or more devices to be notified corresponding to the modified access authentication information. At 403, the gateway device 120 provides the modified access authentication information to the one or more devices to be notified. The processes in 401 to 403 are similar to those in 301 to 303, and thus will not be described in detail.

In some embodiments, as shown in FIG. 4, at 404, the gateway device 120 receives at least one acknowledging response sent by at least one access device 140. The acknowledging response indicates that the modified access authentication information has been successfully received by the corresponding access device 140. In some embodiments, some of the one or more devices to be notified return the acknowledging response. In some embodiments, all of the one or more devices to be notified return the acknowledging response. In some embodiments, the acknowledging response carries a device identification of the corresponding device to be notified. Based on the device identification, the gateway device 120 can determine that the corresponding device to be notified has successfully received the modified access authentication information.

At 405, the gateway device 120 determines remaining device(s) to be notified based on the at least one access device 140 sending the acknowledging response and the devices to be notified. As noted above, a remaining device to be notified refers to a device to be notified that does not successfully receive the modified access authentication information.

In some embodiments, the gateway device 120 determines the remaining device(s) to be notified by itself. Specifically, the gateway device 120 compares device identifications of the access devices 140 sending the acknowledging response with device identifications of the devices to be notified, and determines the remaining devices to be notified according to the comparison results.

For example, the devices to be notified include three access devices 140 respectively having device identifications 1, 2, and 3. The gateway device 120 receives the acknowledging responses fed back by two access devices 140 with the device identifications 1 and 3, respectively. The gateway device 120 may determine that the access device 140 with the device identification 2 does not successfully receive the modified access authentication information and is thus a remaining device to be notified. The reason for not successfully receiving the modified access authentication information may be a power failure of the access device 140, a wireless network connection failure, or the like.

In some embodiments, the determination of the remaining devices to be notified can be conducted via a cloud server. In this scenario, the gateway device 140 sends a second device list and a third device list to the server. The second device list includes the device identifications of the access devices 140 that have sent the acknowledging response, and the third device list includes the device identifications of the devices to be notified. Correspondingly, the server compares the second device list with the third device list, and determines the remaining devices to be notified. After that, the gateway device 120 receives a fourth device list sent by the server. The fourth device list includes the device identifications of the remaining devices to be notified.

By delegating the determination of the remaining devices to be notified to the cloud server, performance requirement and processing overhead of the gateway device 120 are reduced, and the operation is simplified.

According to the present disclosure, the gateway device 120 may enable the modified access authentication information after determining that all of the devices to be notified have successfully received the modified access authentication information. For example, the gateway device 120 may enable the modified access authentication information after receiving the acknowledging responses sent by all of the devices to be notified, to ensure that all of the devices to be notified can quickly reconnect to the gateway device 120 at the first time when the access authentication information is reconfigured.

Alternatively, the gateway device 120 may enable the modified access authentication information at a predetermined time, such as 10 seconds, after the modified access authentication information is sent. This ensures that the modified access authentication information can be enabled in time, even in the situation that some devices to be notified do not feed back the acknowledging response after a long time.

In some embodiments, as shown in FIG. 4, at 406, the gateway device 120 acquires an access request broadcasted by a target access device 140. The access request carries a device identification of the target access device 140. That is, when an access device 140 that does not successfully receive the modified access authentication information, also referred to as a "target access device," discovers that it is unable to use the unmodified access authentication information to connect to the gateway device 120, the target access device 140 may broadcast the access request, which carries the device identification of the target access device 140, such as a MAC address. Correspondingly, the gateway device 120 acquires the access request broadcasted by the target access device 140.

At 407, the gateway device 120 determines whether the target access device 140 is a remaining device to be notified according to the device identification of the target access device 140.

At 408, if the target access device is a remaining device to be notified, the gateway device 120 sends the modified access authentication information to the target access device 140. The gateway device 120 may send the modified access authentication information to the target access device 140 via broadcasting. Alternatively, the gateway device 120 may send the modified access authentication information to the target access device 140 via an extended connection channel established with the target access device 140.

In addition, the target access device 140 may re-establish a wireless network connection with the gateway device 120 by using the modified access authentication information after the modified access authentication information is acquired.

Exemplary devices consistent with the present disclosure are described below, which may be used for performing methods consistent with the present disclosure, such as the exemplary methods described above. Details of the operation of the exemplary devices are omitted.

Figure 5:
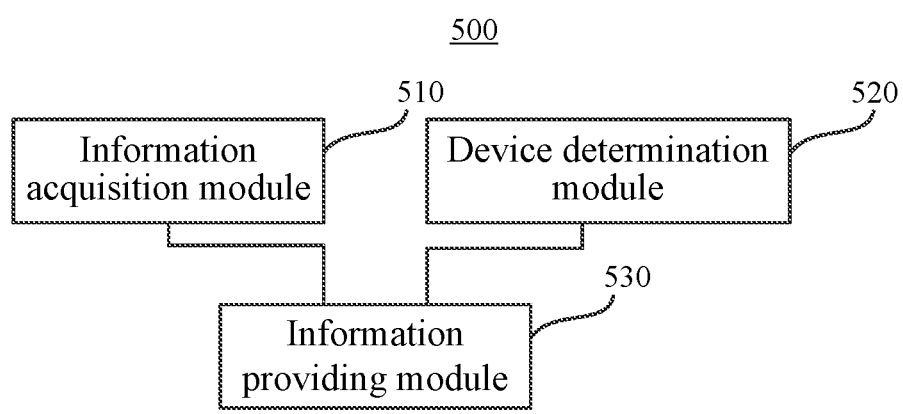
FIG. 5 illustrates a block diagram of an apparatus for providing information, according to an exemplary embodiment.

FIG. 5 illustrates a block diagram of an apparatus 500 for providing information, according to an exemplary embodiment. The apparatus 500 can be implemented, for example, in the gateway device 120 in the implementation environment shown in FIG. 1. The apparatus 500 includes an information acquisition module 510, a device determination module 520, and an information providing module 530. The information acquisition module 510 is configured to, after detecting that access authentication information is modified, automatically acquire the modified access authentication information. The device determination module 520 is configured to determine one or more devices to be notified corresponding to the modified access authentication information. The information providing module 530 is configured to provide the modified access authentication information to the one or more devices to be notified.

Figure 6:
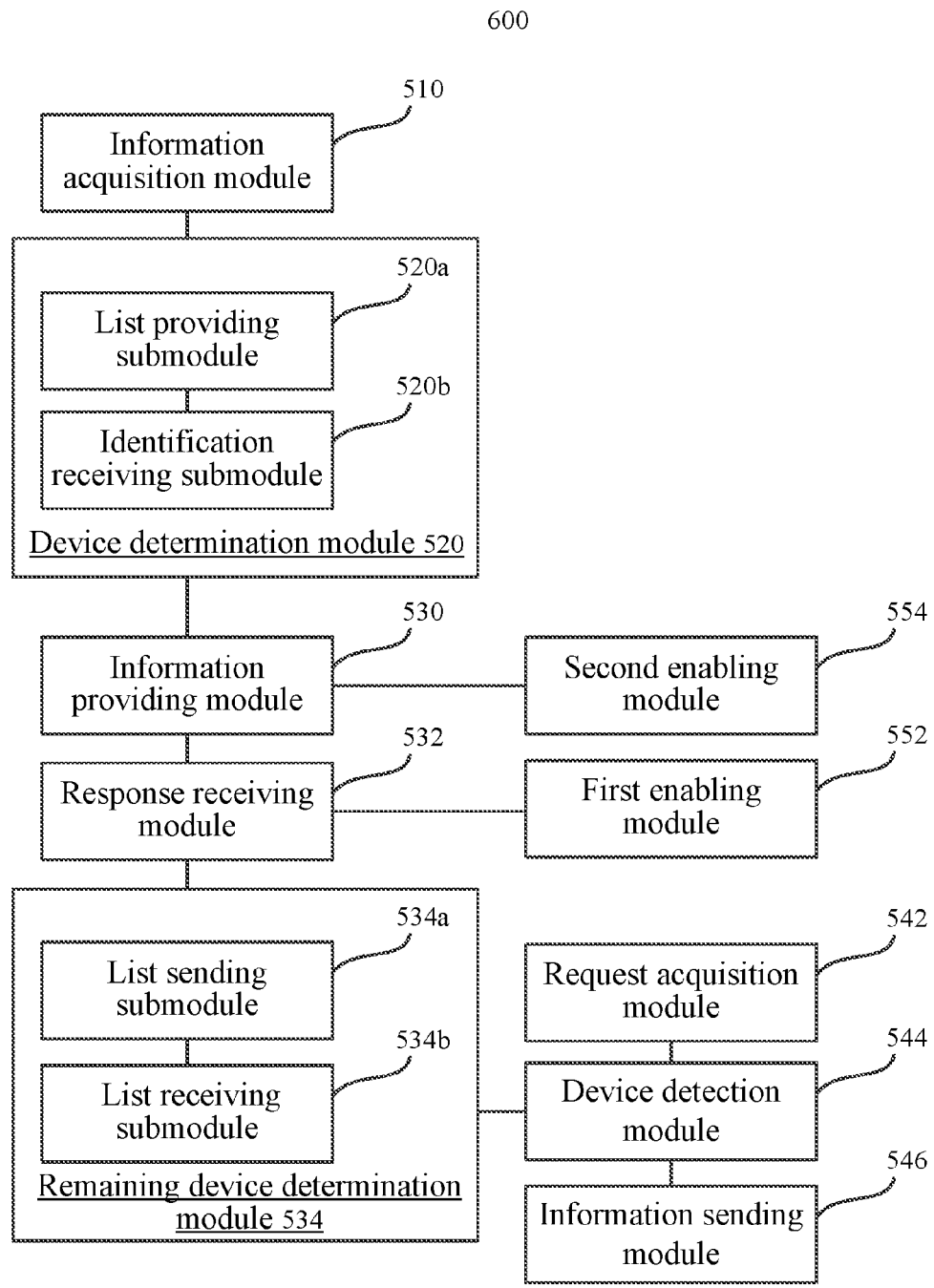
FIG. 6 illustrates a block diagram of an apparatus for providing information, according to another exemplary embodiment.

FIG. 6 illustrates a structural block diagram of an apparatus 600 for providing information, according to another exemplary embodiment. The apparatus 600 can be implemented, for example, in the gateway device 120 in the implementation environment shown in FIG. 1. The apparatus 600 includes the information acquisition module 510, the device determination module 520, and the information providing module 530.

In some embodiments, as shown in FIG. 6, the device determination module 520 includes a list providing submodule 520a and an identification receiving submodule 520b. The list providing submodule 520a is configured to provide a first device list to a user terminal connected with the gateway device 120. The first device list includes device identifications of access devices 140 currently connected to the gateway device 120. The identification receiving submodule 520b is configured to receive one or more target device identifications sent by the user terminal, and determine one or more access devices corresponding to the one or more target device identifications as the one or more devices to be notified. The one or more target device identifications are selected by the user terminal from the first device list.

In some embodiments, the information providing module 530 is further configured to send the modified access authentication information to a device to be notified via a wireless network connection, which is established between the gateway device 120 and the device to be notified based on the unmodified access authentication information.

In some embodiments, as shown in FIG. 6, the apparatus 600 further includes a response receiving module 532 and a remaining device determination module 534. The response receiving module 532 is configured to receive an acknowledging response sent by at least one access device 140. The receiving response indicates that the modified access authentication information has been successfully received by the at least one access device 140. The remaining device determination module 534 is configured to determine remaining device(s) to be notified according to the at least one access device 140 sending the acknowledging response and the one or more devices to be notified.

In some embodiments, the remaining device determination module 534 is further configured to compare device identifications of the access devices 140 sending the acknowledging response with device identifications of the devices to be notified, and determine the remaining device(s) to be notified according to the comparison results.

Alternatively, as shown in FIG. 6, the remaining device determination module 534 includes a list sending submodule 534a and a list receiving submodule 534b. The list sending submodule 534a is configured to send a second device list and a third device list to a server. The second device list includes the device identifications of the access devices 140 sending the acknowledging responses and the third device list includes the device identifications of the devices to be notified. The server compares the second device list with the third device list, and determines the remaining device(s) to be notified. The list receiving submodule 534b is configured to receive a fourth device list sent by the server. The fourth device list includes the device identification(s) of the remaining device(s) to be notified.

In some embodiments, as shown in FIG. 6, the apparatus 600 further include a request acquisition module 542, a device detection module 544, and an information sending module 546. The request acquisition module 542 is configured to acquire an access request broadcasted by a target access device. The access request carries a device identification of the target access device. The device detection module 544 is configured to detect whether the target access device is a remaining device to be notified according to the device identification of the target access device. The information sending module 546 is configured to, if the target access device is a remaining device to be notified, send the modified access authentication information to the target access device.

In some embodiments, as shown in FIG. 6, the apparatus 600 further include a first enabling module 552 configured to enable the modified access authentication information after determining that the modified access authentication information has been successfully received by all of the one or more devices to be notified.

Alternatively or in addition, as shown in FIG. 6, the apparatus 600 further includes a second enabling module 554 configured to enable the modified access authentication information at a predetermined time after the modified access authentication information is sent.

According to the present disclosure, there is provided an apparatus for providing information, such as a gateway device. The apparatus for providing information includes a processor and a memory storing instructions that, when executed by the processor, cause the processor to perform a method consistent with embodiments of the present disclosure.

Figure 7:
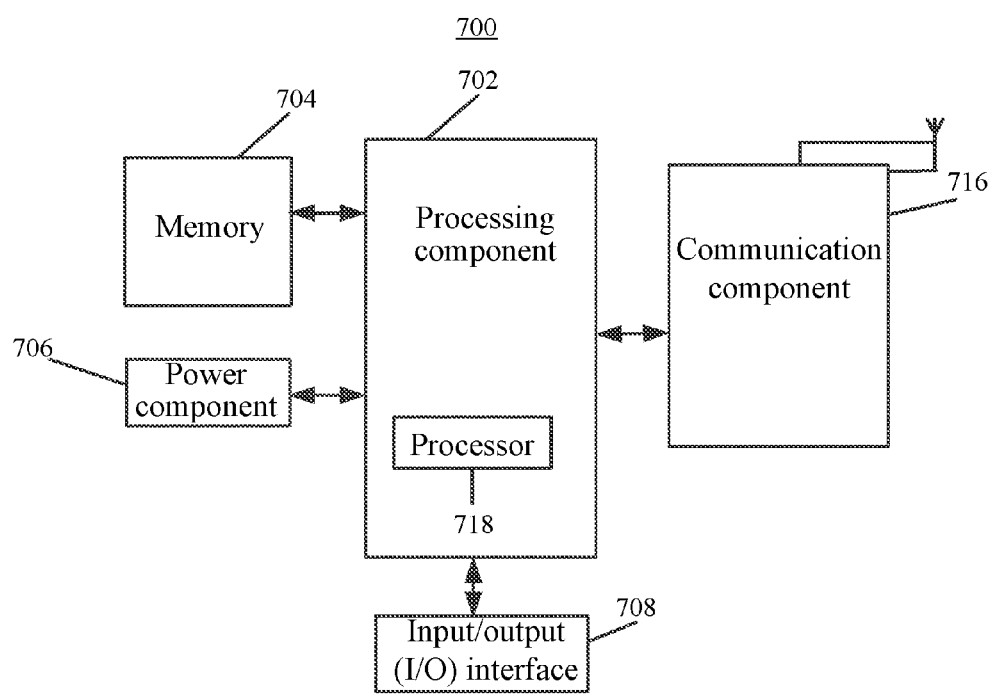
FIG. 7 illustrates a block diagram of an apparatus, according to an exemplary embodiment.

FIG. 7 illustrates a block diagram of a device 700, according to an exemplary embodiment. For example, the device 700 may be a router.

Referring to FIG. 7, the device 700 may include one or more of the following components: a processing component 702, a memory 704, a power component 706, an input/output (I/O) interface 708, and a communication component 716.

The processing component 702 typically controls overall operations of the device 700, such as address resolution, data sending and receiving, and traffic control. The processing component 702 may include one or more processors 718 to execute instructions to perform all or part of the methods consistent with the present disclosure, such as those described above. Moreover, the processing component 702 may include one or more modules which facilitate the interaction between the processing component 702 and other components.

The memory 704 is configured to store various types of data to support the operation of the device 700. Examples of such data include instructions for any applications or methods operated on the device 700, user data, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The I/O interface 708 provides an interface between the processing component 702 and peripheral interface modules.

The communication component 716 is configured to facilitate communication, wired or wirelessly, between the device 700 and other devices. The device 700 can establish a wireless network based on a communication standard, such as WiFi. In one exemplary embodiment, the communication component 716 sends a broadcast signal or broadcast associated information to an external system via a broadcast channel.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 704, executable by the processor 718 in the device 700, for performing methods consistent with the present disclosure. For example, the non-transitory computer-readable storage medium may be a ROM, a RAM, a CD-ROM, a magnetic tape, a floppy disc, an optical data storage device, and the like.

A non-transitory computer-readable storage medium is provided. When the instructions in the storage medium are performed by the processor 718 of the device 700, the device 700 can perform methods for providing information consistent with the present disclosure, such as those shown in FIG. 2, FIG. 3, or FIG. 4.

In addition, according to the present disclosure, modified access authentication information is sent to the device(s) to be notified using existing wireless network connection before being enabled. As such, additional extended connection channel is not required and the modified access authentication information can be provided to the device(s) to be notified by fully utilizing existing transmission resources.

In addition, according to the present disclosure, the modified access authentication information is encrypted before being sent to the device(s) to be notified, and encrypted modified access authentication information is sent to the device(s) to be notified. As such, security of the access authentication information can be improved.

In addition, according to the present disclosure, in the situation that some devices to be notified do not successfully receive the modified access authentication information initially, the gateway device may again provide the modified access authentication information to the remaining device(s) to be notified through subsequent operations. Thus, the remaining device(s) to be notified may quickly and accurately re-connect to the gateway device.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for providing information, comprising:
   acquiring, after detecting that access authentication information for accessing a gateway device is modified, modified access authentication information;
   determining a device to be notified corresponding to the modified access authentication information; providing the modified access authentication information to the device to be notified, wherein one or more devices to be notified are determined and the modified access authentication information is sent to the one or more devices to be notified;
   receiving an acknowledging response sent by an acknowledging device, the acknowledging device being one of the one or more devices to be notified that has successfully received the modified access authentication information;
   determining a remaining device based on the acknowledging device and the one or more devices to be notified, the remaining device being one of the one or more devices to be notified that does not successfully receive the modified access authentication information, wherein determining the remaining device includes:
      sending an acknowledging device list and a notifying device list to a server, the acknowledging device list containing a device identification of the acknowledging device, and the notifying device list containing a device identification of each of the one or more devices to be notified; and
      receiving a remaining device list sent by the server, the remaining device list containing a device identification of the remaining device obtained by comparing the acknowledging device list and the notifying device list by the server; and
   sending, if a target access device is the remaining device, the modified access authentication information to the target access device.

2. The method according to claim 1, wherein determining the device to be notified includes:
   providing a device list to a user terminal coupled to the gateway device, the device list containing device identifications of access devices currently connected to the gateway device;
   receiving a target device identification sent by the user terminal; and
   determining an access device corresponding to the target device identification as the device to be notified.

3. The method according to claim 1, wherein providing the modified access authentication information to the device to be notified includes:
sending the modified access authentication information to the device to be notified via a wireless network connection established between the gateway device and the device to be notified based on the access authentication information before being modified.

4. The method according to claim 1, wherein determining the remaining device includes:
comparing a device identification of the acknowledging device and a device identification of each of the one or more devices to be notified; and
determining the remaining device according to a result of the comparison.

5. The method according to claim 1, further comprising:
acquiring an access request broadcasted by the target access device, the access request carrying a device identification of the target access device; and
determining whether the target access device is the remaining device according to the device identification of the target access device.

6. The method according to claim 1, further comprising:
enabling the modified access authentication information after determining that the modified access authentication information has been successfully received by the device to be notified.

7. The method according to claim 1, further comprising:
enabling the modified access authentication information at a predetermined time after providing the modified access authentication information to the device to be notified.

8. A gateway device, comprising:
a hardware processor; and
a memory storing instructions that, when executed by the hardware processor, cause the hardware processor to:
acquire, after detecting that access authentication information for accessing the gateway device is modified, modified access authentication information;
determine a device to be notified corresponding to the modified access authentication information;
provide the modified access authentication information to the device to be notified, wherein one or more devices to be notified are determined and the modified access authentication information is sent to the one or more devices to be notified;
receive an acknowledging response sent by an acknowledging device, the acknowledging device being one of the one or more devices to be notified that has successfully received the modified access authentication information; and
determine a remaining device based on the acknowledging device and the one or more devices to be notified, the remaining device being one of the one or more devices to be notified that does not successfully receive the modified access authentication information, wherein the instructions further cause the hardware processor to:
send an acknowledging device list and a notifying device list to a server, the acknowledging device list containing a device identification of the acknowledging device, and the notifying device list containing a device identification of each of the one or more devices to be notified;
receive a remaining device list sent by the server, the remaining device list containing a device identification of the remaining device obtained by comparing the acknowledging device list and the notifying device list by the server; and
send, if a target access device is the remaining device, the modified access authentication information to the target access device.

9. The gateway device according to claim 8, the instructions further causing the hardware processor to:
provide a device list to a user terminal coupled to the gateway device, the device list containing device identifications of access devices currently connected to the gateway device;
receive a target device identification sent by the user terminal; and
determine an access device corresponding to the target device identification as the device to be notified.

10. The gateway device according to claim 8, the instructions further causing the hardware processor to:
send the modified access authentication information to the device to be notified via a wireless network connection established between the gateway device and the device to be notified based on the access authentication information before being modified.

11. The gateway device according to claim 8, the instructions further causing the hardware processor to:
compare a device identification of the acknowledging device and a device identification of each of the one or more devices to be notified; and
determine the remaining device according to a result of the comparison.

12. The gateway device according to claim 8, the instructions further causing the hardware processor to:
acquire an access request broadcasted by the target access device, the access request carrying a device identification of the target access device; and
determine whether the target access device is the remaining device according to the device identification of the target access device.

13. The gateway device according to claim 8, the instructions further causing the hardware processor to:
enable the modified access authentication information after determining that the modified access authentication information has been successfully received by the device to be notified.

14. The gateway device according to claim 8, the instructions further causing the hardware processor to:
enable the modified access authentication information at a predetermined time after providing the modified access authentication information to the device to be notified.

15. A non-transitory computer-readable storage medium storing instructions that, when executed by a hardware processor of a gateway device, cause the gateway device to:
acquire, after detecting that access authentication information for accessing the gateway device is modified, modified access authentication information;
determine a device to be notified corresponding to the modified access authentication information;
provide the modified access authentication information to the device to be notified, wherein one or more devices to be notified are determined and the modified access authentication information is sent to the one or more devices to be notified;
receive an acknowledging response sent by an acknowledging device, the acknowledging device being one of the one or more devices to be notified that has successfully received the modified access authentication information; and determine a remaining device based on the acknowledging device and the one or more devices to be notified, the remaining device being one of the one or more devices to be notified that does not successfully receive the modified access authentication information, wherein the instructions further cause the gateway device to:

send an acknowledging device list and a notifying device list to a server, the acknowledging device list containing a device identification of the acknowledging device, and the notifying device list containing a device identification of each of the one or more devices to be notified;

receive a remaining device list sent by the server, the remaining device list containing a device identification of the remaining device obtained by comparing the acknowledging device list and the notifying device list by the server; and send, if a target access device is the remaining device, the modified access authentication information to the target access device.

* * * * *